United States Patent [19]

Kawamura et al.

[11] Patent Number: 4,903,123
[45] Date of Patent: Feb. 20, 1990

[54] IMAGE PROCESSING APPARATUS USING INCLINED LINE SCREENS TO REDUCE MOIRÉ

[75] Inventors: Naoto Kawamura; Hidejiro Kadowaki, both of Yokohama, Japan

[73] Assignee: Canon Kabushiki Kaisha, Tokyo, Japan

[21] Appl. No.: 204,031

[22] Filed: Jun. 8, 1988

[30] Foreign Application Priority Data

Jun. 10, 1987 [JP] Japan ................... 62-143044
Jun. 10, 1987 [JP] Japan ................... 62-143045

[51] Int. Cl.⁴ ............................................. H04N 1/40
[52] U.S. Cl. ........................................ 358/75; 358/454; 358/456
[58] Field of Search ............... 382/50; 358/75, 80, 358/283, 454, 456

[56] References Cited

U.S. PATENT DOCUMENTS

| | | | |
|---|---|---|---|
| 4,507,685 | 3/1985 | Kawamura | 358/283 |
| 4,517,605 | 5/1985 | Yokomizo | 358/280 |
| 4,553,173 | 11/1985 | Kawamura | 358/283 |
| 4,595,956 | 6/1986 | Kawamura et al. | 358/283 |
| 4,626,901 | 12/1986 | Tanioka | 358/75 |
| 4,626,923 | 12/1986 | Yoshida | 358/283 |
| 4,680,625 | 7/1987 | Shoji et al. | 358/75 |
| 4,752,822 | 6/1988 | Kawamura | 358/75 |
| 4,768,082 | 8/1988 | Hiratsuka et al. | 358/75 |
| 4,783,837 | 11/1988 | Kawamura et al. | 382/50 |
| 4,800,442 | 1/1989 | Riseman et al. | 358/280 |
| 4,812,910 | 3/1989 | Komiya | 358/282 |
| 4,814,886 | 3/1989 | Kuze et al. | 358/293 |

OTHER PUBLICATIONS

Halftone Reproduction on Digital Color Printer Based on Electrophotography (III), Method of Expansion to the Case w/Screen Angles, Nakamura, Kitajima, Kadowaki—pp. 31-43.

Primary Examiner—Howard W. Britton
Assistant Examiner—Kim Yen Vu
Attorney, Agent, or Firm—Fitzpatrick, Cella, Harper & Scinto

[57] ABSTRACT

There is disclosed an apparatus for processing a halftone image into a digital dot image. There are generated plural dots for the data of each pixel so as to form line screens in such a manner that smallest ones of the dots among the pixels constitute a line screen while other dots constitute line screens inclined to the scanning direction, in order to reduce Moiré fringe pattern.

9 Claims, 14 Drawing Sheets

| 1 | 9 | 17 | 25 | 2 | 10 | 18 | 26 |
|---|---|----|----|---|----|----|----|
| 3 | 11 | 19 | 27 | 4 | 12 | 20 | 28 |
| 5 | 13 | 21 | 29 | 6 | 14 | 22 | 30 |
| 7 | 15 | 23 | 31 | 8 | 16 | 24 | 32 |
| 2 | 10 | 18 | 26 | 1 | 9 | 17 | 25 |
| 4 | 12 | 20 | 28 | 3 | 11 | 19 | 27 |
| 6 | 14 | 22 | 30 | 5 | 13 | 21 | 29 |
| 8 | 16 | 24 | 32 | 7 | 15 | 23 | 31 |

FIG. 10

| a | | | | | | | | | | | | | | | | | |
|---|---|---|---|---|---|---|---|---|---|---|---|---|---|---|---|---|---|
| 1 | 7 | 13 | 19 | 25 | 3 | 37 | 43 | 49 | 2 | 8 | 14 | 20 | 26 | 32 | 38 | 44 | 50 |
| 3 | 9 | 15 | 21 | 27 | 33 | 39 | 45 | 51 | 4 | 10 | 16 | 22 | 28 | 34 | 40 | 46 | 52 |
| 5 | 11 | 17 | 23 | 29 | 35 | 41 | 47 | 53 | 6 | 12 | 18 | 24 | 30 | 36 | 42 | 48 | 54 |
| 2 | 8 | 14 | 20 | 26 | 32 | 38 | 44 | 50 | 1 | 7 | 13 | 19 | 25 | 31 | 37 | 43 | 49 |
| 4 | 10 | 16 | 22 | 28 | 34 | 40 | 46 | 52 | 3 | 9 | 15 | 21 | 27 | 33 | 39 | 45 | 51 |
| 6 | 12 | 18 | 24 | 30 | 36 | 42 | 49 | 54 | 5 | 11 | 17 | 23 | 29 | 35 | 41 | 47 | 53 |

L = 1

L = 2

L = 3

L = 4

L = 5

L = 6

L = 7

L = 12

L = 18

L = 30

L = 40

L = 54

FIG. 18
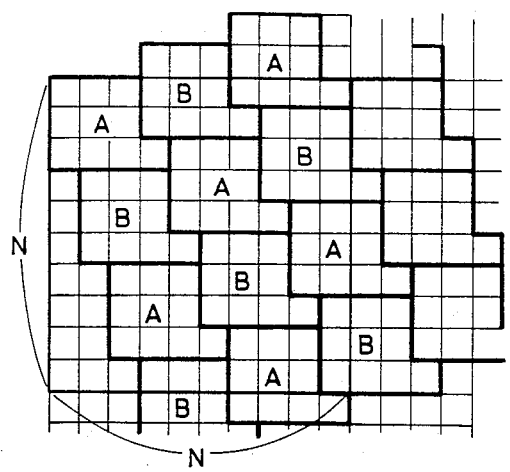
FIG. 19
FIG. 20
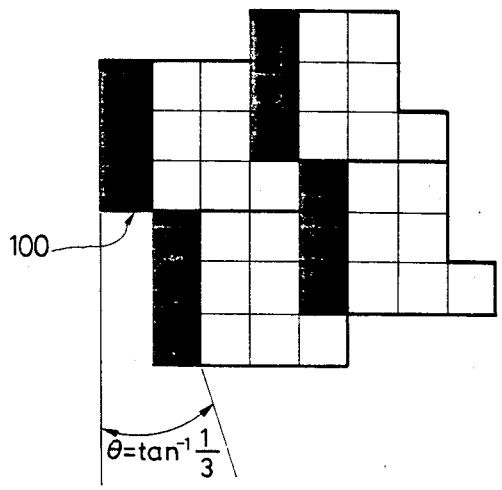
100
$\theta = \tan^{-1}\frac{1}{3}$

FIG. 22

|    |    |    |    |    |    |    |    |    | 2  | 8  | 14 | 20 | 26 | 32 | 38 | 44 | 50 |    |    |    |
|----|----|----|----|----|----|----|----|----|----|----|----|----|----|----|----|----|----|----|----|----|
| 1  | 7  | 13 | 19 | 25 | 31 | 37 | 43 | 49 | 55 | 4  | 10 | 16 | 22 | 28 | 34 | 40 | 46 |    |    |    |
| 56 | 3  | 9  | 15 | 21 | 27 | 33 | 39 | 45 | 51 | 57 | 6  | 12 | 18 | 24 | 30 | 36 | 42 | 48 | 54 | 60 |
| 52 | 58 | 5  | 11 | 17 | 23 | 29 | 35 | 41 | 47 | 53 | 59 | 1  | 7  | 13 | 19 | 25 | 31 | 37 | 43 | 49 |
|    |    |    | 2  | 8  | 14 | 20 | 26 | 32 | 38 | 44 | 50 | 56 | 3  | 9  | 15 | 21 | 27 | 33 | 39 | 45 |
|    |    |    | 55 | 4  | 10 | 16 | 22 | 28 | 34 | 40 | 46 | 52 | 58 | 5  | 11 | 17 | 23 | 29 | 35 | 41 | 47 | 53 | 59 |
|    |    |    | 51 | 57 | 6  | 12 | 18 | 24 | 30 | 36 | 42 | 48 | 54 | 50 |    |    |    |    |    |    |

FIG. 24

| a | 2 | | 3 | | | 4 | | | | 5 | | | |
|---|---|---|---|---|---|---|---|---|---|---|---|---|---|
| b | 1 | 2 | 1 | 2 | 3 | 1 | 2 | 3 | 4 | 1 | 2 | 3 | 4 | 5 |
| N | 10 | 4 | 10 | 26 | 6 | 34 | 20 | 50 | 8 | 26 | 58 | 34 | 82 | 10 |
| θ° | 26.6 | 45 | 18.4 | 33.7 | 45 | 14.0 | 26.6 | 36.9 | 45 | 11.3 | 21.8 | 31.0 | 38.7 | 45 |
| No | 5 | 8 | 10 | 13 | 18 | 17 | 20 | 25 | 32 | 26 | 29 | 34 | 41 | 50 |
| \|u\| | √5 | √8 | √10 | √13 | √18 | √17 | √20 | √25 | √32 | √26 | √29 | √34 | √41 | √50 |
| Q | 3,5,7 | 2,3,4 | 4,7,10 | 4,7,10 | 2,3,4 | 5,9,13 | 3,5,7 | 5,9,13 | 2,3,4 | 6,11,16 | 6,11,16 | 6,11,16 | 6,11,16 | 2,3,4 |

IMAGE PROCESSING APPARATUS USING INCLINED LINE SCREENS TO REDUCE MOIRé

BACKGROUND OF THE INVENTION

1. Field of the Invention

The present invention relates to an image processing apparatus for applying tonal processing on input pixel information.

2. Related Background Art

For obtaining a halftone image from a digital printer or the like there have been proposed various methods, including the dither method and density pattern method.

These methods are used in various fields because:

(1) an image with intermediate tone can be reproduced with a binary display device;
(2) they can be easily realized by hardware; and
(3) they can achieve image quality of a certain level.

More specifically, as shown in FIGS. 2A and 2B, pixels 8 of an input image (input pixel information) are compared with components of a threshold value matrix 5, and white or black level in an output image on a display screen 6 is determined according to whether the input pixel information is larger or smaller the threshold values. FIG. 2A represents the dither method, in which a pixel 8 of the input image is compared with a component of the threshold value matrix 5. FIG. 2B represents the density pattern method, in which an input pixel 8 is compared with all the components of the threshold value matrix 5. Therefore, in the density pattern method, a pixel of the input image is represented by plural cells on the display screen 6.

The dither method and the density pattern method are essentially the same, except that an input pixel is compared with a component of the threshold value matrix in the former, with all the components thereof in the latter. Naturally there exist intermediate methods, for example a method of comparing an input pixel with plural ones among all the components of the threshold value matrix (for example 2×2 i.e., 4 components in FIG. 2B).

Consequently there is no basic difference between these two methods, so that the dither method, density pattern method and intermediate methods will hereinafter be collectively called the dither methods.

In such dither methods, the threshold value matrix can be prepared in various manners. However not much effort has been made in the development of a method for obtaining an output image of high quality in simple manner. In such dither methods, an output image with improved tonal rendition can be obtained without sacrificing the resolving power, by (1) employing small threshold value matrices as the unit of resolving power; and
(2) employing large matrices as the unit of tonal rendition.

The present inventors reported, in a report "Halftone Reproduction for Digital Color Printing in Electrophotography" Journal of the Electrophotographic Society, Vol. 25, No. 1, P31 (1986), a method of dividing a dither matrix into four sub-matrices of which diagonally positioned ones have the same threshold values, and employing a multi-level digitization for obtaining a high resolving power and a high tonal rendition. This method was named by the present inventors the IH (Improved Halftone) method.

The present inventors have expanded this IH method to the image containing screen angles, and have avoided the formation of Moiré fringe patterns by selecting different screen angles for different colors in forming a color output image.

Though such methods can be suitable for reproducing intermediate tone, a screened original (or an original composed of screen dots) will generate beats with the threshold value matrix, thus forming so-called Moiré fringe patterns and deteriorating the image quality.

Also the image quality is often deteriorated even with the aforementioned IH method by the uneven pitch of output dots, resulting from a face inclination of a rotary polygonal mirror or a fluctuation in rotation of a photosensitive drum, often encountered in a scanning optical system of a laser beam printer or the like.

Besides there, have been proposed various methods for tonal processing of input pixel information, for example those disclosed in the U.S. Pat. Nos. 4,812,910, 4,517,605, 4,595,956, 4,507,685, 4,553,173, 4,783,837, 4,752,822, 4,626,923, 4,626,901, 4,814,886 and 4,800,442, but further improvements would be desirable.

SUMMARY OF THE INVENTION

An object of the present invention is to eliminate the above-explained drawbacks.

Another object of the present invention is to provide an improvement on an image processing apparatus for tonal processing of input pixel information.

Still another object of the present invention is to provide an image processing apparatus capable of providing a reproduced image of high quality.

Still another object of the present invention is to provide an image processing apparatus capable of reproducing an image of excellent intermediate tone with a simple structure.

Still another object of the present invention is to provide an image processing apparatus capable of providing a desired color image.

Still another object of the present invention is to provide an image processing apparatus capable of providing a reproduced image excellent in resolution and in tonal rendition.

Still another object of the present invention is to provide an image processing apparatus capable of reproducing an image faithful to the original.

Still another object of the present invention is to provide an image processing apparatus capable of forming smooth diagonal line screens.

Still another object of the present invention is to provide an image processing apparatus capable of reducing the formation of Moiré fringe patterns even in the reproduction of a screened original and increasing the mechanical tolerance while maintaining resolution and tonal rendition.

Still other objects, as well as features and advantages, of the present invention will become fully apparent from the following detailed description of the preferred embodiments thereof, to be taken in conjunction with the attached drawings, and from the appended claims.

BRIEF DESCRIPTION OF THE DRAWINGS

FIG. 10 is a view of a threshold value matrix when the matrix shown in FIG. 4 is applied to multi-level digitization;

FIGS. 16 to 18 are views showing the method of forming a threshold value matrix with a screen angle;

FIG. 19 to 23 are views showing application of threshold value matrix with screen angle to the multi-level digitization; and FIG. 24 is a chart showing variations of the screen angle.

DETAILED DESCRIPTION OF THE PREFERRED EMBODIMENTS

Now the present invention will be clarified in detail by description of the preferred embodiments thereof shown in the attached drawings. In the following embodiments there will be at first explained monochromatic image reproduction, and then color image reproduction.

Monochromatic Image Reproduction

Conversion from image data to laser beam

Figures 3, 4:
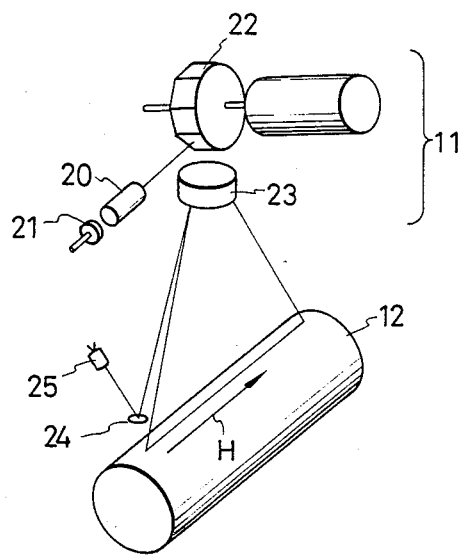
FIG. 3 is a schematic view of an optical system to be employed in an embodiment of the present invention.
FIG. 4 is a view of a threshold value matrix to be employed in a mono-chromatic embodiment.

FIG. 3 is a schematic perspective view of a scanning optical system, for example of a laser beam printer, to be employed for obtaining a visible image from the image data obtained in the image processing apparatus of the present invention. A light beam modulated by a semiconductor laser 21 is collimated by a collimating lens 20, then deflected by a rotary polygonal mirror 22, and focused by an imaging lens 23, called an f-$\theta$ lens, thereby being focused on and scanning a photosensitive drum 12. At the starting end of the scanning line, the light beam is reflected by a mirror 24 and guided to a detector 25, of which detection signal, indicating the scanning position of the beam, is used as a synchronization signal in the horizontal scanning direction H.

Figure 1:
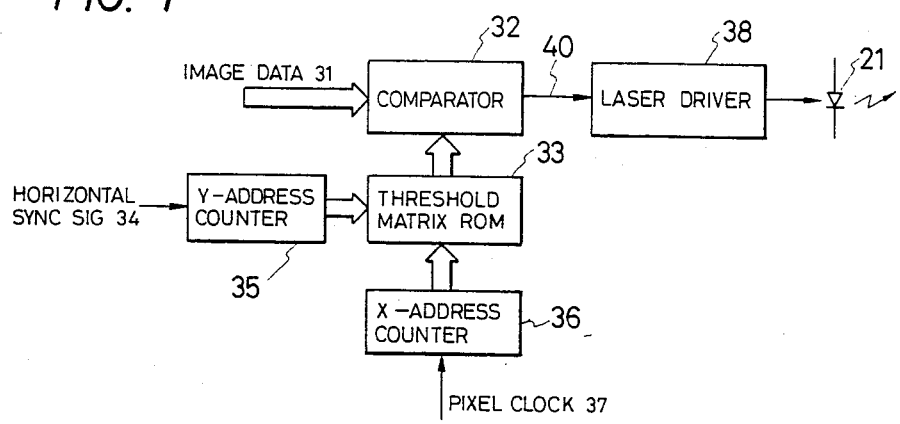
FIG. 1 is a block diagram of an image processing apparatus containing a dither process circuit.
Figure 2A:
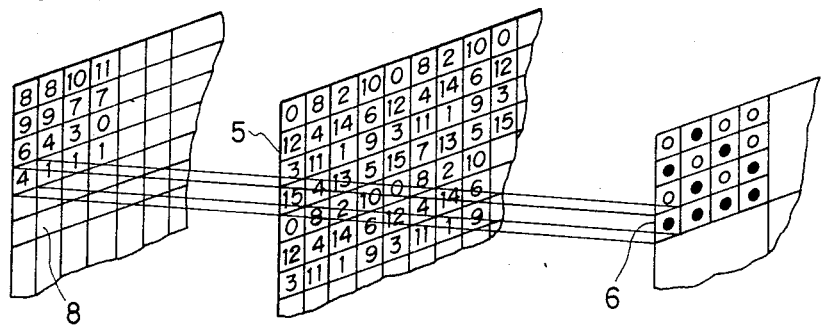
FIGS. 2A and 2B are schematic views showing reproduction of intermediate tone.
Figure 2B:
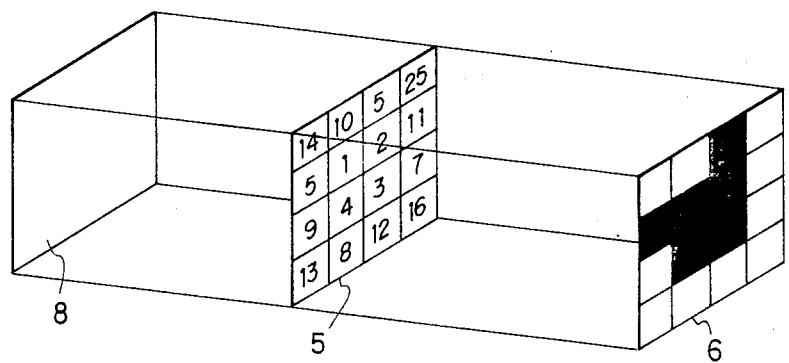

FIG. 1 is a block diagram of a circuit for modulating the semiconductor laser 21. Input image data (input pixel information) 31 are usually digital signals of 8 bits per pixel, and are supplied to a comparator 32 for comparison with the output from a threshold value matrix ROM 33. The ROM 33 stores a threshold value matrix, and the threshold values are taken out one by one by means of an X-address counter 36 and a Y-address counter 35. The data of the matrix are also of 8 bits in general.

The comparator releases an output "1" when $I \leq T_{xy}$, or "0" when $I < T_{xy}$, wherein $T_{xy}$ is the threshold value, x and y are addresses of the matrix, and I is the image data 31. The output signal 40 ("1" or "0") from the comparator 32 is supplied to a laser driver 38 for turning on and off the semiconductor laser 21.

The X- and Y-addresses given to the threshold value matrix 33 are prepared from pixel clock signals 37 and horizontal synchronization signals 34. The components of the threshold value matrix are taken out one by one by means of the pixel clock signals 37 and horizontal synchronization signals 34 and are given as the threshold value data to the comparator 32.

Threshold value matrix

FIG. 4 shows an example of the data of the threshold value matrix of the ROM 33. This example is an 8×8 matrix comprising four 4×4 sub-matrices, wherein the sub-matrices in the diagonal positions have the same data.

Figure 5:
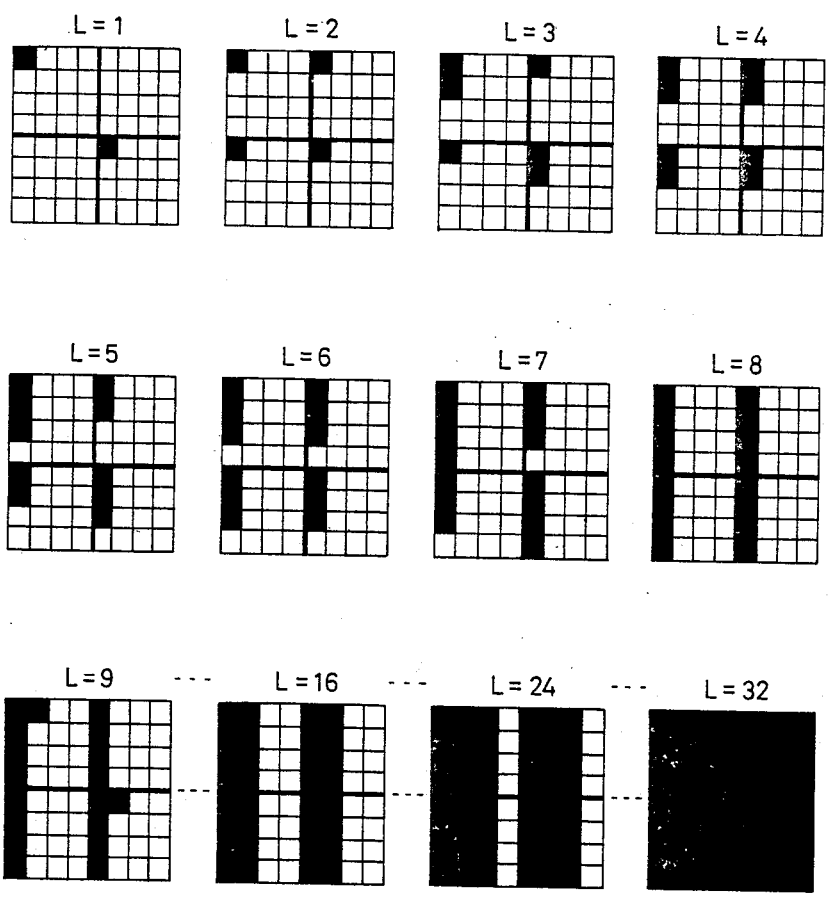
FIG. 5 is a view showing examples of dots obtained from the threshold value matrix shown in FIG. 4.

FIG. 5 shows examples of the image output obtained with the threshold value matrix shown in FIG. 4 when the image data 31 change from lighter side to darker side. For ease of explanation, the cases L=1 to 8 are called highlight portions. The 8×8 threshold value matrix is composed of four 4×4 sub-matrices, and the output dots increase as the level goes higher, and are connected as two vertical lines at L=8.

Resolution is conserved by binary digitization with such four 4×4 sub-matrixes, and the tonal rendition is also conserved by the use of four sub-matrices. In addition, the same threshold values are used in diagonal ones among the four sub-matrixes, since otherwise there may appear only one dot in the 8×8 matrix for L=1 and the image appears too coarse. The use of the same threshold values in the diagonal sub-matrices reduces the output dot pitch to $4\sqrt{2}$, thus decreasing the coarseness. Also the use of the same diagonal components, realizing simultaneous dot growth in the diagonal direction, improves the symmetric nature of the output image, and eliminates the texture noises of texture structure.

Feature of threshold value matrix

The image output with the threshold value matrix shown in FIG. 4 has following features:

(1) isolated dots are obtained in the highlight areas of the image; and
(2) a line screen of vertical lines is obtained in the intermediate density area of the image, and these features lead to following advantages:
(3) satisfactory reproduction of tonal rendition; and
(4) an increased tolerance for the mechanical precision of the printer.

More specifically there is obtained an increased tolerance for the precision of face inclination of the rotary polygonal mirror, precision of rotary driving of the photosensitive drum, and mechanical vibration of the equipment.

Prevention of image quality deterioration in the vertical direction

Figure 6:
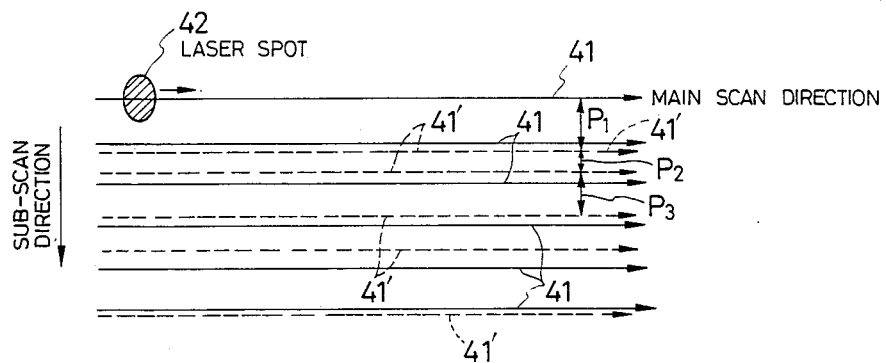
FIGS. 6, 7A, 7B, 8 and 9 are views for explaining aberration in raster resulting from a mechanical error.
Figure 7A:
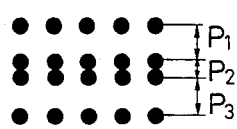
Figure 7B:
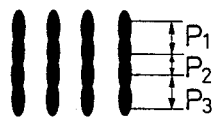

In the following there will be explained the above-explained advantage (4). FIG. 6 shows the state of raster scanning with a laser beam spot 42 along the main scanning direction 41. The position of the raster 41 may be aberrated as shown by 41', for example due to face inclination of the rotary polygonal mirror 22, uneven rotation of the photosensitive drum 12 or mechanical vibration. FIGS. 7A and 7B illustrate show the influence of such aberration. In the conventional dither method of dot fattening type, the pitch of the grating points varies as shown by P1, P2 and P3 in FIG. 7A, so that dots mutually overlap in some parts, thus deteriorating the image quality. On the other hand, in the method employing the threshold value matrix shown in FIG. 4, the dots are distributed in the vertical direction and overlap in the vertical lines in the intermediate density area of the image, so that the output pattern is not affected by the fluctuation in the pitch of scanning rasters as shown in FIG. 7B.

On the other hand, in the highlight areas of the image (L=1 to 7 in FIG. 5), the dots are not connected as vertical lines but are isolated with a low density, so that the probability of overlapping of the dots of neighboring lines may be low even with the fluctuation of pitch. Also eventual dot overlapping will not be conspicuous to the human eyes as these dots are in the low density area.

Figure 8:
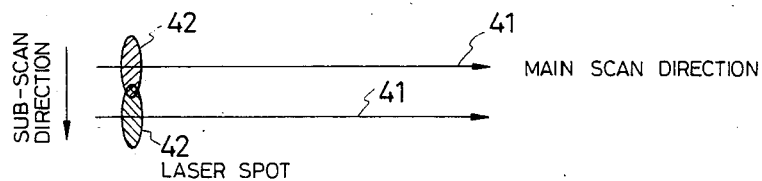

FIG. 8 shows an embodiment in which the shape of the beam spot from the semiconductor laser 21 is modified in order to enhance the above-mentioned advantage (4). In this embodiment the laser spot 42 is shaped as an oval extended in the sub-scanning direction in such a manner that the laser spots mutually overlap at a normal pitch of the rasters 41. The spot diameter in this case corresponds to $1/e^2$ of the peak power.

Figure 9:
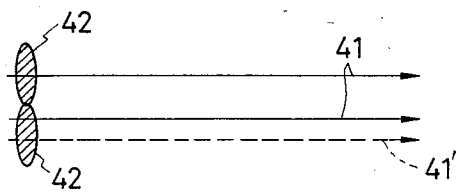
Figure 11A:
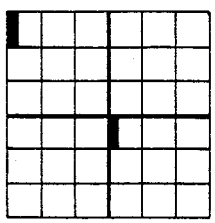
FIGS. 11A to 11L are views showing examples of output by the threshold value matrix shown in FIG. 10.
Figure 11B:
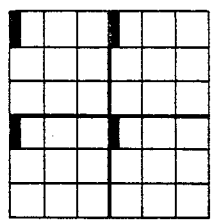
Figure 11C:
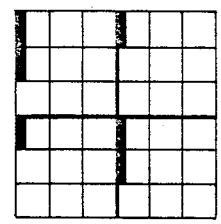
Figure 11D:
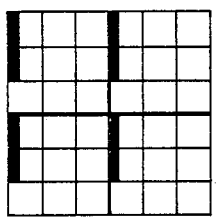
Figure 11E:
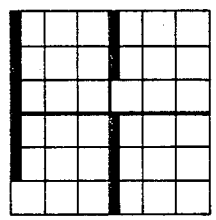
Figure 11F:
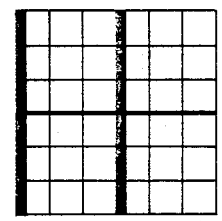
Figure 11G:
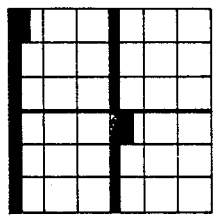
Figure 11H:
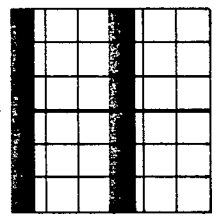
Figure 11I:
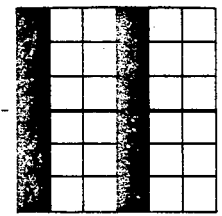
Figure 11J:
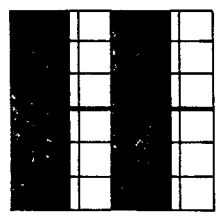
Figure 11K:
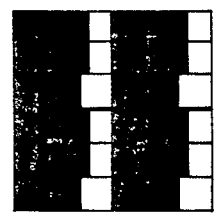
Figure 11L:

In this manner the overlapping of the laser spots in maintained when the raster fluctuates from 41 to 41' (broken line), as shown in FIG. 9, by a variation of the scanning pitch, so that the recorded line conserves the pattern shown in FIG. 7B.

Application to multi-level digitization

FIG. 10 shows an example of the threshold value matrix when the present invention is applied to a multi-level dither method.

Multi-level output can be achieved in various methods, but, in the present embodiment, there is employed pulse width modulation of the laser activation in the main scanning direction. More specifically, the laser is turned on for the duration of a pulse shorter than the width a of a pixel, thereby obtaining an output of reduced black area and realizing multi-level digitization. The threshold value matrix shown in FIG. 10 is formed by placing four 3×3 sub-matrices in the same manner as in FIG. 4. Thus the threshold values are the same in the sub-matrices in the diagonal direction. In addition, in order to obtain four levels (including total white), each pixel is made to correspond to three threshold values along the main scanning direction. FIGS. 11A to 11L show the outputs with the threshold value matrix from image data of L=1 to 54.

Figures 12A, 12B, 12C, 13A:
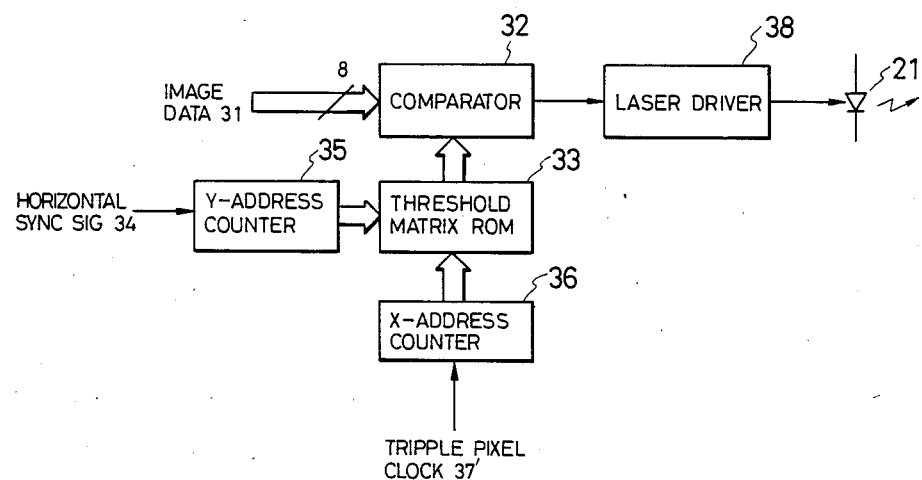
FIGS. 12A to 12C are views showing various states in quaternary digitization.
FIGS. 13A to 13C are block diagrams showing examples of a multi-level digitizing circuit.

FIGS. 12A to 12C illustrate three different modes of pulse width modulation for 4-level output, wherein:
 (a) shows a pulse width of a/3;
 (b) shows a pulse width of 2a/3; and
 (C) shows a pulse width of 3a/3,
in which a is the pixel size. FIG. 12A shows a method of aligning the pulses at the left hand end, while FIG. 12B shows a method of aligning the pulses at the center.

The foregoing threshold value matrix shown in FIG. 4 can only process 33 levels, but the threshold value matrix shown in FIG. 10 with the above-explained multi-level image processing apparatus can process up to 55 levels. In general, the number L of density levels obtained with the above-explained process employing an M×M threshold matrix containing (M/2)×(M/2) sub-matrices and l-level digitization is given by:

$$L = M^2 \times \tfrac{1}{4} \times (l-1) + 1$$

In case of the threshold value matrix shown in the FIG. 4:

$$L = 8^2 \times \tfrac{1}{4} \times 1 + 1 = 33$$

and, for the threshold value matrix shown in FIG. 10:

$$L = 6^2 \times \tfrac{1}{4} \times (4-1) + 1 = 55$$

Multi-level digitizing circuit

Figure 13B:
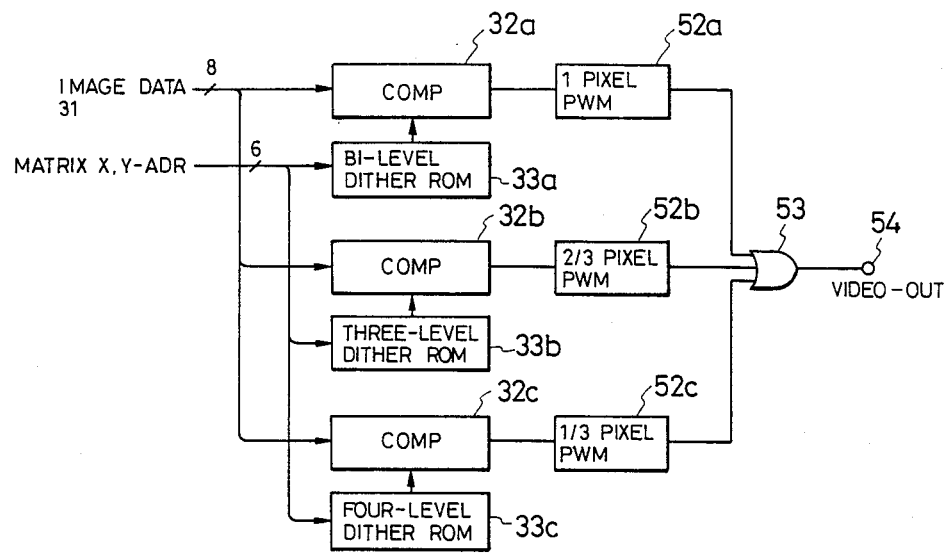
Figure 13C:
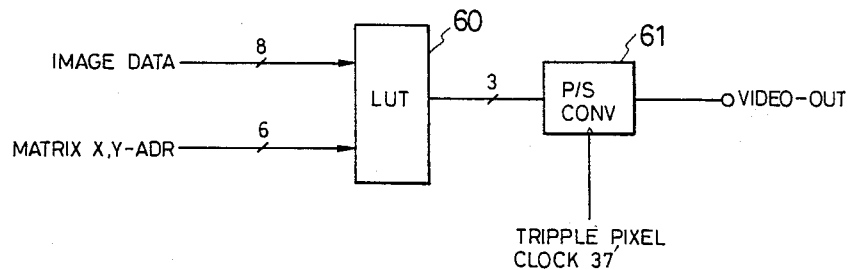

FIGS. 13A to 13C show three examples of the quaternary digitizing circuit.

FIG. 13A shows a circuit which is a mere expansion of the circuit shown in FIG. 1 to quaternary digitization, and this circuit employs an 18×6 threshold value matrix as shown in FIG. 10, in which each pixel is divided along the main scanning direction. Consequently, different from the embodiment shown in FIG. 1, the frequency of the pixel clock signal in the X-direction is three times as large as that in the Y-direction, so that a triple pixel clock signal 37' is employed. The above-explained circuit shows a high resolution in the main scanning direction, and therefore requires a high pixel clock frequency. Therefore, in the case of a high-speed printer, there is required an even higher frequency for the triple pixel clock signal. More specifically there is required a frequency three times as large as that of the transfer clock signal for the image data 31.

Thus, FIG. 13B proposes a circuit operable with a single pixel clock signal. In this circuit, quaternary digitization is achieved by operating circuits for binary, ternary and quaternary outputs in parallel manner and synthesizing these outputs. From the threshold value matrix shown in FIG. 10, there are prepared three 6×6 matrices, taking the lowest one of the threshold values in each pixel for the quaternary digitization, the medium one for the ternary digitization, and the highest one for the binary digitization. These matrices are stored respectively a quaternary dither ROM 33c, a ternary dither ROM 33b and a binary dither ROM 33a, and are used in parallel manner. Comparators 32a–32c respectively compare the image data 31 with the threshold values of the matrices at the same time and release output signals. Pulse width modulation (PWM) circuits 52a–52c connected to the comparators 32a–32c are composed for example of one-shot multivibrators and have pulse width determined in advance according to the levels of digitization. The outputs of different levels are obtained at the same time, and a signal of largest pulse width is obtained by an OR gate 53.

In this manner there is obtained a pulse-width modulated signal 54 VIDEO-OUT. This method does not require a pixel clock signal of a frequency of (l−1) times for 1-level digitization, thereby reducing the cost of the circuit. However, since the largest pulse width is obtained by the OR gate 53, there cannot be obtained an output (c) shown in FIGS. 12A to 12C.

There is therefore proposed a circuit shown in FIG. 13C, in which a look-up table (LUT) 60 receives the image data and the address data for the threshold value matrix and releases encoded parallel output data to be converted into serial data codes by a parallel/serial converter 61. The look-up table 60 is composed for example of a ROM. As an example, let us consider a case of image data "8" for an (x, y) address (1, 1) corresponding to the upper left corner of the threshold value matrix. The output signal from the look-up table 60 is 3 bits, for example $(110)_B$ wherein B indicates a binary number. The signal is converted by the succeeding parallel/serial converter 61 into serial signals 1-1-0, with the most significant bit first. The output signals are produced in synchronization with the triple pixel clock signal 37'.

The magnitude of the look-up table 60 is as follows. The look-up table 60 has input addresses of 14 bits, comprising image data of 8 bits, and X, Y addresses of 6 bits for the threshold value matrix (for a 6×6 matrix, 3 bits for 0–5 in the X-direction and 3 bits for 0–5 in the Y-direction), so that an address space of 16K is required. The output can be released with 2 bits if encoded form is adopted.

The above-explained three circuits for multi-level digitization can provide advantages similar to those of the binary embodiment shown in FIG. 1.

Suppression of Moiré fringe pattern

Figure 14A:
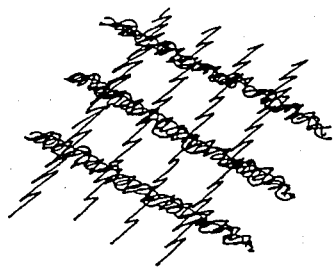
FIG. 14A is a schematic view showing the principle of formation of Moiré fringe patterns in the prior art.
Figure 14B:
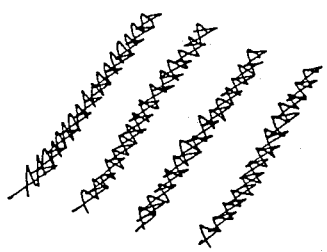
FIG. 14B is a schematic view showing reduction of formation of Moiré fringe patterns in the present embodiment.

In the following there will be explained the formation of Moiré fringe pattern. If the dither method is applied to a screened original, a beat is generated by the interference between the periodicity of the screen dots and the periodicity of the dither pattern, thus forming Moiré fringe patterns. If the dither pattern is formed as screen dots, the Moiré fringe pattern appears as two-dimensional crosslines as shown in FIG. 14A. However, if the dither pattern is formed as a line screen of one direction only, as in the threshold value matrices shown in FIGS. 4 and 10, the Moiré fringe pattern appears as lines in one direction as shown in FIG. 14B. Thus the Moiré fringe pattern is eliminated least in the sub scanning direction, and is therefore visually reduced to about a half. Also the angle of beat formation is reduced, so that the probability of formation of Moiré fringe pattern is also reduced.

Suppression of Moiré fringe pattern in horizontal direction

The foregoing threshold value matrices, for example shown in FIG. 4, are principally designed for reducing the Moiré fringe pattern and expanding the tolerance of mechanical precision, both in the vertical direction (sub-scanning direction), but such requirements can naturally exist in the horizontal (main scanning) direction. For this purpose there is proposed a modified embodiment in which the dot growth in the threshold value matrix in the intermediate density area takes place in the horizontal (main scanning) direction. The threshold value matrix in this case can be obtained by rearranging the matrix shown in FIG. 4 in such a manner that the dot growth takes place in the horizontal direction. In this manner it is rendered possible to suppress the Moiré fringe pattern and to expand the tolerance of the mechanical precision in the horizontal direction.

Application to color image reproduction

The foregoing embodiments shown in FIGS. 1 to 14B are designed for monochromatic image reproduction. In the following there will be explained an embodiment applied to the color image reproduction, while making reference to FIG. 15 and ensuing drawings. In the embodiment there are employed threshold value matrices having line screens of different angles for different colors for eliminating "color Moiré fringe pattern" in the color image reproduction. Because of the differences in angle, the line screens have diagonal lines. In the present embodiment, the dot growth takes place along the diagonal line screen for each color, and the Moiré fringe pattern caused by the screentone image is thus suppressed. Thus, as in the monochromatic image reproduction explained before, the suppression of the Moiré fringe pattern in the diagonal direction reduces the one-dimensional pattern at most.

Structure of color printing apparatus

Figure 15:
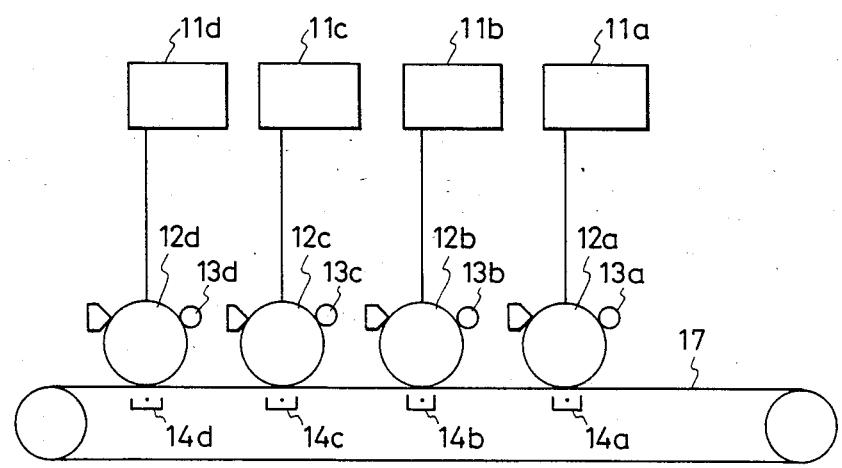
FIG. 15 is a view showing the structure of an output unit of an embodiment applied to color images.

FIG. 15 is a schematic view of a color image recording apparatus embodying the present invention, wherein each of 11a–11d is a scanning optical system as shown in FIG. 3, and desired image information is taken out from an unrepresented image memory by the scanning systems in the form of light beams for exposure on photosensitive drums 12a–12d respectively for cyan (C), magenta (M), yellow (Y) and black (Bl). The photosensitive drums 12a–12d are associated with developing units 13a–13d for different colors, and with chargers 14a–14d across a conveyor belt 17 for transporting unrepresented recording sheets. The above-explained apparatus functions in the following manner. The light beams emitted and modulated by the scanning optical systems 11a–11d are focused on the photosensitive drums 12a–12d, and thus focused images are converted by an electrophotographic process into electrostatic latent images, which are developed by the developing units 13a–13d and transferred by the chargers 14a–14d in succession onto the recording sheet transported by the conveyor belt 17, whereby a color image is obtained.

Threshold value matrix with screen angle

In color image reproduction, the output patterns are usually made different for different colors. If a same threshold value matrix is used for different colors, the dots of different colors may be mutually overlapped completely or placed completely side by side, for example due to an error in the registration of scanning optical systems, skewed advancement of recording sheet or elongation or contraction thereof, thereby generating so-called "color Moiré fringe pattern", leading to unevenness in the tonal rendition or in the color hue. It therefore becomes difficult to obtain uniform color in stable manner. For this reason different screen angles are employed respectively for different colors, thereby increasing the frequency of the Moiré fringe pattern. However, in the dither method, since the number of pixels constituting a screen dot is limited, there can be obtained only a limited number of discrete screen angles. Also the pitch screen dots varies depending on the screen angle. Consequently it is important to select suitable screen angles.

In the following there will therefore be explained the method of preparing a threshold value matrix capable of forming uniform recording dot pattern and having an adequate screen angle.

Figure 16:
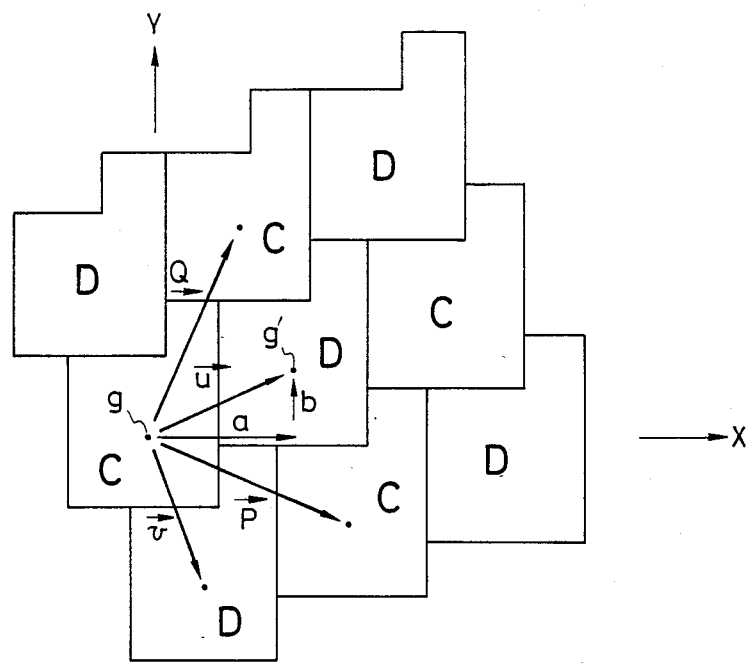

There is considered a case of forming screen dots with a screen angle by an appropriate displaced arrangement of basic cells C, D of different threshold values. The basic cell means a pattern in which threshold values are repeatedly arranged. In order to obtain a screen angle, the basic cells C, D are repeated with a displacement a in the X-direction and b in the Y-direction as shown in FIG. 16. Points g, g' indicate the corresponding positions in the basic cells. The form of the basic cells need not be rectangular as long as they can be arranged in a close packing.

Such arrangement of the basic cells can be given by two basic vectors (unit vectors) u, v in the following manner:

$$\vec{u} = (a, b) \quad (1)$$
$$\vec{v} = (b, -a) \quad (a > b)$$

Since $\vec{u}\cdot\vec{v} = ab - ba = 0$, $\vec{u} \perp \vec{v}$, that is $\vec{u}$ and $\vec{v}$ are mutually perpendicular. The directions of u, v indicate the directions of arrangement of the basic cells. The arrangement shown in FIG. 16 can be obtained by placing two basic cells C, D of different threshold values along such two directions of arrangement.

Appropriate matrix size

In the following there is determined the size N of a square threshold value matrix representing a pitch of the screen dots. Two basic vectors P, Q constituting the basic cell C are represented as:

$$\vec{P} = \vec{u} + \vec{v} = (a + b, b - a) \quad (2)$$
$$\vec{Q} = \vec{u} - \vec{v} = (a - b, b + a)$$

Since $\vec{P}\cdot\vec{Q} = 0$, $\vec{P} \perp \vec{Q}$, that is, $\vec{P}$ and $\vec{Q}$ are mutually perpendicular.

Figure 17:
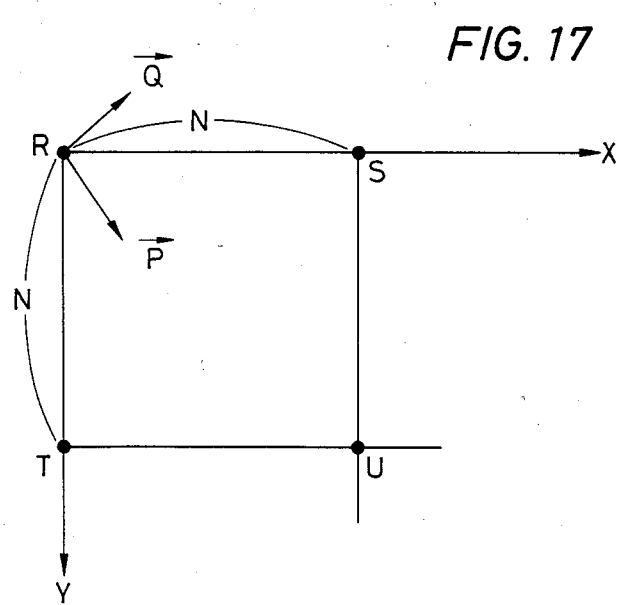

In order to obtain a uniform grating pattern of screen dots, there is considered a square (N×N) threshold value matrix as shown in FIG. 17. In order that the threshold values have periodicity in the N×N square threshold value matrix, the threshold value at the corner R should be equal to the values at points S, T, U distant by N in the X- and Y-directions. Consequently, there should be determined minimum integers m, n satisfying:

$$\mathrm{mod}(m\vec{P} + n\vec{Q}, N) = \vec{O}$$

wherein $\vec{O} = (0, 0)$. The presentation mod(a, b) means the remainder of division a/b. For example mod(10, 3) = 1. The number N determined from the integers m, n indicates the size of the threshold value matrix for obtaining uniform pattern of recording dots.

When the threshold values are so constructed that a cycle exists between a point R and a point S in the X-direction, it can be easily proven that points T and U also satisfy the requirement of periodicity. Therefore, the following relation represents the condition that the points R and S satisfy the requirement of periodicity:

$$m\vec{P} + n\vec{Q} = \vec{S} \text{ wherein } \vec{S} = (N, O) \quad (3)$$

By substituting the equation (2) into (3):

$$m(\vec{u} + \vec{v}) + n(\vec{u} - \vec{v}) = \vec{S}$$

$$m(a+b, b-a) + n(a-b, a+b) = (N, O)$$

There are also obtained:

$$\begin{cases} m(a + b) + n(a - b) = N & (4a) \\ m(b - a) + n(a + b) = 0 & (4b) \end{cases}$$

From these equations (4a) and (4b) there are determined minimum integers m, n satisfying:

$$\frac{m}{n} = \frac{a + b}{a - b} \quad (5)$$

Then these values, m, n are used in the equation (4a) to determine the size N of the threshold value matrix.

Thus there is obtained a relation:

$$N = LCM(a + b, a - b)\frac{a - b}{a + b} + \frac{a + b}{a - b} \quad (6)$$

wherein LCM(X, Y) indicates the least common multiple of X and Y.

The above-explained method for determining the size N of the threshold value matrix is also disclosed in U.S. Ser. No. 029,386 (Mar. 23, 1987).

FIG. 18 shows a threshold value matrix for a=3 and b=1, and N=10 is obtained from the equation (6). In basic cells A, B shown in FIG. 18, the threshold values are determined as in the absence of the screen angle.

FIG. 19 shows an example of the threshold values composed of the two basic cells A, B and constituting a line screen. This example can provide 21 gray levels by the use of aforementioned IH method.

FIG. 20 shows an output pattern obtained with the threshold value matrix shown in FIG. 19, at an image density level L=6. In this example there is obtained a screen of:

$$\theta = \tan^{-1}(\tfrac{1}{3}) = 18.4°$$

Therefore, also in case of a color image, there can be obtained advantages of:

(1) formation of isolated dots in the highlight portion of the image;
(2) formation of a diagonal line screen in the intermediate density area of the image;
(3) satisfactory reproduction of tonal rendition;
(4) an increased tolerance for the mechanical precision of the printer;
(5) suppression of Moiré fringe pattern generated by the screen dot image in the diagonal direction of the line screen; and
(6) simultaneous suppression of color Moiré fringe pattern.

Improvement

Though the above-explained method aims at formation of a diagonal screen in the color image processing, a smooth diagonal screen cannot be obtained as shown by 100 in FIG. 20. In the following improvement a multi-level output is employed for obtaining smooth screen lines.

Figure 21:
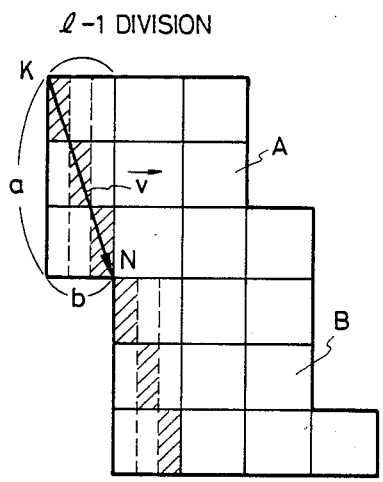

FIG. 21 shows the principle of multi-level digitization in a state a=3, b=1 as an example. For obtaining levels of a number l (including total white), each pixel is to be divided into (l−1). In FIG. 21, fine segments obtained by dividing each pixel into (l−1) are called micropixels. For achieving smooth recording from a point K to a point N there is required following consideration. The number of micropixels per pixels of a number a is represented by:

$$b \times (l-1)$$

so that there exist:

$$b/a \times (l-1) = \text{an integer} (\equiv K)$$

pixels per each pixel. For smooth recording the following condition should be satisfied:

$$l = a/b \times K + 1 \quad (7)$$

wherein ( is an integer equal to or larger than 2. By using the conditions a=3, b=1 shown in FIG. 21, the levels of integer l are determined as follows:

$$l = \frac{3}{1} \times K + 1 \quad (K = 1, 2, \ldots)$$
$$= 4, 7, 10, \ldots$$

FIG. 21 shows a state l=4, in which the hatched micropixels constitute a screen with an angle of 18.4°. Stated differently, FIG. 21 illustrates output dots in response to uniform image data of a predetermined density. As will be apparent from FIG. 21, the thinnest dots, corresponding to the lowest density, can be so formed as to be mutually connected, so that there can be obtained a smooth diagonal line screen.

FIG. 22 shows the threshold values of the basic cells for the IH method at l=4, indicating the mode of line thickening. Naturally the entire threshold value matrix has a size of 10×10, as shown in FIG. 18 and determined from the relation (6). The threshold value matrix shown in FIG. 22, satisfying the condition (7), can generate a smooth diagonal line screen.

Figure 23:
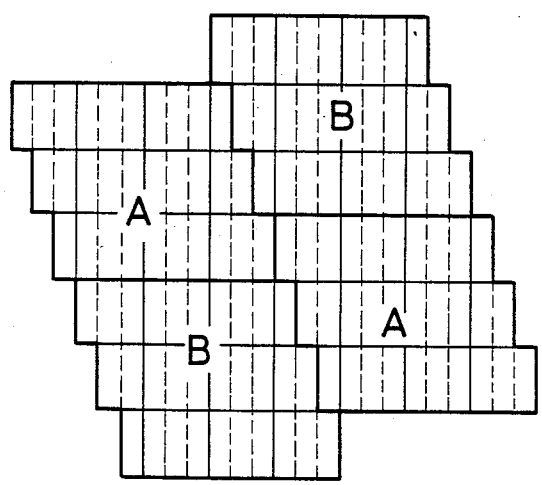

FIG. 23 shows the structure of FIG. 22 rearranged in units of micropixels for ease of understanding, wherein the basic cell has a nearly parallelogram shape. Similar discussion is applicable to the cases of l=7, 10, ...

FIG. 24 summarizes the foregoing discussion in a table, indicating:
size N of the threshold matrix;
screen angle θ;
number No of pixels in the basic cell;
length |u| of the displacement vector; and
minimum three of the number l of levels as the function of the displacement vector u=(a'b).

The table shown in FIG. 24 facilitates the determination of the specifications of the circuit, providing different screen angles for the different colors Y, M, C and B1.

In the foregoing embodiments a laser beam printer is employed as the output apparatus, there may be employed other output apparatus such as an ink jet printer or a LED printer.

The present invention is not limited to the foregoing embodiments but is subject to various modifications within the scope and spirit of the appended claims.

We claim:

1. An image processing apparatus comprising:
pixel data input means;
process means for intermediate tone processing of the pixel data entered by said input means to generate reproduction signals for dot formation; and
scanning means for effecting line scanning in accordance with the reproduction signals generated by said process means,
wherein said process means is adapted to generate the reproduction signals in such a manner that plural microdots are formed for each pixel data and that a line screen is formed by a group of said plural microdots, and further in such a manner that, in response to pixel data of a predetermined uniform density, a line screen is formed by continuously connecting the smallest microdots among plural microdots in each pixel and the line screen formed by connecting the smallest microdots is oblique to the direction of said line scanning.

2. An image processing apparatus according to claim 1, wherein said process means is adapted to effect intermediate tone processing of said input pixel data by means of a predetermined threshold value matrix, and to generate pulse-width modulated signals.

3. An image processing apparatus according to claim 1, wherein said input means is adapted to enter pixel data of different colors, and an angle of a line screen formed by pixel data of each color is different for each color.

4. An image processing apparatus according to claim 2, wherein said scanning means comprises means for modulating a beam on the basis of said pulse-width modulated signals, thereby forming an image on a recording medium.

5. An image processing apparatus according to claim 4, wherein said image forming means comprises means for generating a synchronization signal indicating the scanning position of said beam, and the threshold values of said predetermined threshold value matrix are produced in response to said synchronization signal.

6. An image processing apparatus comprising:
input means for inputting pixel data; and
means for processing the pixel data input by said input means;
said processing means having dither processing means for performing dither conversion of the pixel data in accordance with a dither matrix composed of plural kinds of basic cells of threshold values, each cell being of the same shape but having different arrangements of threshold values, said plural kinds of basic cells being alternately arranged in two orthogonal directions and being shifted relative to one another in row and column directions of said dither matrix by a and b, respectively, where a and b represent displacements between the plural kinds of basic cells, a and b each having a value other than zero;
the dither matrix having a size N x N determined in accordance with N=m(a+b)+n(a−b) where m and n are minimum values of integers which satisfy m/n=(a+b)/(a−b);
wherein said dither matrix has (l−1) threshold values for each input pixel data for forming microdots of a number (l−1) for each input pixel data; and
wherein a relation:

$$l = a/b \times K + 1$$

is satisfied,
in which l is an integer equal to or larger than 3, and K is a natural number.

7. An apparatus according to claim 6, wherein said dither processing means comprises memory means for storing the dither matrix and comparing means for comparing the pixel data input by said input means with threshold values of the dither matrix read out from said memory means to output a pulse-width modulated signal.

8. An apparatus according to claim 7 further comprising image forming means for forming an image on a record medium by modulating a beam on the basis of the pulse width modulated signal, the threshold values of said dither matrix being selected in accordance with the performance of an image forming operation by said image forming means.

9. An apparatus according to claim 8, wherein said input means is capable of inputting color pixel data representing different color components, and said dither processing means utilizes a different dither matrix for each color component so as to enable said image forming means to form an image having a different screen angle for each color component.

* * * * *

UNITED STATES PATENT AND TRADEMARK OFFICE
CERTIFICATE OF CORRECTION

PATENT NO. : 4,903,123
DATED : February 20, 1990
INVENTOR(S) : NAOTO KAWAMURA, ET AL.

It is certified that error appears in the above-identified patent and that said Letters Patent is hereby corrected as shown below:

SHEET 7 OF 14

FIG. 13A, "TRIPPLE" should read --TRIPLE--.

SHEET 8 OF 14

FIG. 13C, "TRIPPLE" should read --TRIPLE--.

COLUMN 1

Line 13, "and" should read --and the--.

COLUMN 3

Line 25, "the" should be deleted.
    Line 66, "$I \leq T_{xy}$," should read --$I \geq T_{xy}$,--.

COLUMN 4

Line 46, "image, and" should read --image, ¶ and--.
    Line 67, "illustrate" should be deleted.

COLUMN 5

Line 27, "in" should read --is--.

COLUMN 9

Line 11, "$\vec{u}\cdot\vec{v} = ab-ba = 0, \vec{u}\ \vec{v},$" should read --$\vec{u}\cdot\vec{v} = ab-ba = 0, \vec{u}\perp\vec{v},$--.

UNITED STATES PATENT AND TRADEMARK OFFICE
CERTIFICATE OF CORRECTION

PATENT NO. : 4,903,123
DATED : February 20, 1990
INVENTOR(S) : NAOTO KAWAMURA, ET AL.

It is certified that error appears in the above-identified patent and that said Letters Patent is hereby corrected as shown below:

COLUMN 11

Line 8, "wherein (" should read --wherein 1--.
Line 41, "length |u|" should read --length $|\vec{u}|$--.
Line 43, "vector $\vec{u}$ = (a'b)." should read --vector $\vec{u}$ = (a,b).--.

COLUMN 12

Line 68, "pulse width modulated signal," should read --pulse-width modulated signal,--.

Signed and Sealed this

Twenty-seventh Day of August, 1991

Attest:

HARRY F. MANBECK, JR.

*Attesting Officer*  *Commissioner of Patents and Trademarks*